(12) United States Patent
Kamei et al.

(10) Patent No.: US 10,136,657 B2
(45) Date of Patent: Nov. 27, 2018

(54) FREEZER DEVICE FOR CONTAINERS

(71) Applicant: DAIKIN INDUSTRIES, LTD., Osaka-shi, Osaka (JP)

(72) Inventors: Noritaka Kamei, Osaka (JP); Kazuhide Mizutani, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/750,065

(22) PCT Filed: Aug. 22, 2016

(86) PCT No.: PCT/JP2016/003801
§ 371 (c)(1),
(2) Date: Feb. 2, 2018

(87) PCT Pub. No.: WO2017/038038
PCT Pub. Date: Mar. 9, 2017

(65) Prior Publication Data
US 2018/0213808 A1 Aug. 2, 2018

(30) Foreign Application Priority Data
Aug. 28, 2015 (JP) .................................. 2015-168743

(51) Int. Cl.
*A23B 7/148* (2006.01)
*A23B 7/04* (2006.01)
(Continued)

(52) U.S. Cl.
CPC ................. *A23B 7/148* (2013.01); *A23B 7/04* (2013.01); *B01D 69/02* (2013.01); *F25D 11/00* (2013.01);
(Continued)

(58) Field of Classification Search
CPC ......... A23B 7/148; A23B 7/04; F25D 17/042; F25D 17/067; F25D 17/045;
(Continued)

(56) References Cited

U.S. PATENT DOCUMENTS 5,156,009 A * 10/1992 Woodruff .............. A23L 3/3418
426/418
5,341,653 A * 8/1994 Tippmann ............. F25D 11/003
62/280

(Continued)

FOREIGN PATENT DOCUMENTS

JP 61-10143 Y2 4/1986
JP 8-167 A 1/1996
(Continued)

*Primary Examiner* — Emmanuel Duke
(74) *Attorney, Agent, or Firm* — Birch Stewart Kolasch & Birch, LLP

(57) ABSTRACT

Disclosed is a container refrigeration apparatus including a unit case of an inside air control system disposed outside a container, the unit case housing an air pump therein. The container refrigeration apparatus is provided with an air inlet unit independent of the unit case. The air inlet unit and the air pump are connected together by a tube. The air inlet unit is provided with a membrane filter, and is disposed above the unit case. Malfunctions of electrical components and corrosion on metallic components due to moisture permeation into the unit case are reduced.

5 Claims, 12 Drawing Sheets

(51) Int. Cl.
  *F25D 11/00* (2006.01)
  *F25D 23/00* (2006.01)
  *B01D 69/02* (2006.01)
  *F25D 17/04* (2006.01)
(52) U.S. Cl.
  CPC .......... *F25D 11/003* (2013.01); *F25D 17/042* (2013.01); *F25D 23/00* (2013.01)
(58) Field of Classification Search
  CPC ...... F25D 23/003; F25D 11/003; F25D 11/00; F25D 23/00; F25B 17/02; F24F 5/0096; B01D 69/02
  See application file for complete search history.

(56) References Cited

U.S. PATENT DOCUMENTS

| | | | |
|---|---|---|---|
| 5,515,693 A | 5/1996 | Cahill-O'Brien et al. | |
| 5,795,370 A | 8/1998 | Garrett et al. | |
| 6,763,677 B1 * | 7/2004 | Burchill | F24F 13/12 62/129 |
| 6,945,071 B1 * | 9/2005 | Simeone | B60H 1/26 62/190 |
| 2004/0035553 A1 * | 2/2004 | Bosher | A23L 3/3418 165/48.1 |
| 2014/0202183 A1 * | 7/2014 | Chadwick | A23L 3/3418 62/78 |
| 2014/0308409 A1 * | 10/2014 | Savur | B01D 53/22 426/118 |
| 2016/0227802 A1 | 8/2016 | Tanaka et al. | |
| 2016/0245555 A1 | 8/2016 | Tanaka et al. | |
| 2017/0254581 A1 | 9/2017 | Kamei et al. | |

FOREIGN PATENT DOCUMENTS

| | | |
|---|---|---|
| JP | 9-105577 A | 4/1997 |
| JP | 2002-274608 A | 9/2002 |
| JP | 2006-52913 A | 2/2006 |
| JP | 2007-509309 A | 4/2007 |
| JP | 2012-136287 A | 7/2012 |
| JP | 2015-72103 A | 4/2015 |
| JP | 2016-61466 A | 4/2016 |
| WO | WO 2015/049840 A1 | 4/2015 |

\* cited by examiner

US 10,136,657 B2

FREEZER DEVICE FOR CONTAINERS

TECHNICAL FIELD

The present invention relates to a container refrigeration apparatus including an inside air control system which controls a composition of the air in the container.

BACKGROUND ART

Container refrigeration apparatuses that have been known in the art include a refrigerant circuit performing a refrigeration cycle to cool the air in a container for use, e.g., in marine transportation (see, e.g., Patent Document 1). The container is loaded, for example, with plants such as bananas and avocados. Plants perform respiration by absorbing oxygen in the air and releasing carbon dioxide even after they are harvested. As the plants respire, the plants lose the nourishment and moisture stored in them, resulting in a decrease in freshness of the plants. Thus, the oxygen concentration in the container is preferably lowered not to cause breathing problems.

Patent Document 1 discloses an inside air control system which, using an adsorbent adsorbing a nitrogen component in the air through pressurization, generates nitrogen-enriched air having a higher nitrogen concentration and a lower oxygen concentration than the air does, and supplies the nitrogen-enriched air to the interior of the container, thereby reducing the oxygen concentration of the air in the container to reduce the breathing of the plants and easily keep the plants fresh. This inside air control system sends, using an air pump, the pressurized air to an adsorption column housing the adsorbent therein to perform an adsorption operation in which a nitrogen component is adsorbed to the adsorbent. Then, the inside air control system sucks the air from the adsorption column using the air pump to perform a desorption operation in which the nitrogen component that has been adsorbed to the adsorbent is desorbed. As a result, the nitrogen-enriched air is generated.

This inside air control system may be formed as one unit by housing the components of the inside air control system in a hermetically sealed unit case, and this unit may be attached to an exterior space of the container refrigeration apparatus. Thus, even an existing container, if the unit is retrofitted thereto, can control the oxygen concentration in the interior of the container using the nitrogen mixed gas.

CITATION LIST

Patent Document

[Patent Document 1] Japanese Unexamined Patent Publication No. 2015-072103

SUMMARY OF THE INVENTION

Technical Problem

If the unit case is airtight, a pressure inside the unit case may be changed due to the temperature difference between the interior and exterior of the unit case, and moisture may permeate through a fine gap of the unit case into the unit case due to capillarity, resulting in an unwanted situation where insulation failure occurs in the electrical components. Thus, the unit case has to be an air-permeable unit case. However, if the unit case is air-permeable, ventilators may be splashed with sea water in the marine atmosphere, and corrosion may occur on the electrical components and metallic components in the unit case.

In view of the foregoing background, the present invention is directed to a container refrigeration apparatus where a unit case housing an inside air control system is disposed outside a container. It is an object of the present invention to provide a technique for reducing malfunctions of electrical components and corrosion on metallic components due to moisture permeation into the unit case.

Solution to the Problem

A first aspect of the present disclosure is directed to a container refrigeration apparatus which includes an inside air control system (60) configured to supply the interior of a container with a mixed gas.

In the container refrigeration apparatus, an inlet taking air into an air pump (31) provided to an interior of a unit case (36) of housing the inside air control system (60) is formed in an air inlet unit (75) independent of the unit case (36), the air pump (31) and the air inlet unit (75) being connected together by an air tube (85), and the air inlet unit (75) is provided with an air-permeable, waterproof membrane filter (76), and is disposed above the unit case (36) of the inside air control system (60).

According to the first aspect, the air inlet unit (75) provided with the membrane filter (76) is disposed above the unit case (36) of the inside air control system (60). Thus, the air inlet unit (75) is less likely to be splashed with sea water even in the marine atmosphere.

A second aspect of the present disclosure is an embodiment of the first aspect of the present disclosure. In the second aspect, the unit case (36) of the inside air control system (60) is disposed in a space below a condenser (22) of an external storage space (S1), and the air inlet unit (75) provided with the membrane filter (76) is disposed in a space above the condenser (22).

According to the second aspect, the air inlet unit (75) is disposed in the space above the condenser (22). Thus, the air inlet unit (75) is much less likely to be splashed with sea water.

A third aspect of the present disclosure is an embodiment of the second aspect of the present disclosure. In the third aspect, the space, provided with the air inlet unit (75), above the condenser (22) is a blowout side space to which the air that has passed through the condenser (22) is blown.

According to the third aspect, the space above the condenser (22) is the blowout side space to which the air that has passed through the condenser (22) is blown, and is the space to which hot air is blown. Thus, even if the air inlet unit (75) is splashed with sea water, the water is likely to be evaporated.

A fourth aspect of the present disclosure is an embodiment of the third aspect of the present disclosure. In the fourth aspect, the air inlet unit (75) includes an air box (78) to which the membrane filter (76) is attached, and a filter cover (79) which covers the membrane filter (76) from above.

According to the fourth aspect, the filter cover (79) is provided to cover the membrane filter (76). Thus, the air inlet unit (75) is much less likely to be soiled with dirt and dust.

A fifth aspect of the present disclosure is an embodiment of the fourth aspect of the present disclosure. In the fourth aspect, the air box (78) of the air inlet unit (75) is disposed on a side of an electrical component box (17) disposed in the space above the condenser (22).

Advantages of the Invention

According to the first aspect, the air inlet unit (75) provided with the membrane filter (76) thereon is disposed above the unit case (36) of the inside air control system (60). Thus, the air inlet unit (75) is less likely to be splashed with sea water even in the marine atmosphere. This hardly allows water to permeate from the air inlet unit (75) into the unit case (36) of the inside air control system (60). Therefore, this can reduce malfunctions of electrical components and corrosion on metallic components due to moisture permeation into the unit case (36).

According to the second aspect, the air inlet unit (75) is disposed in the space above the condenser (22). Thus, the air inlet unit (75) is much less likely to be splashed with sea water. Therefore, this can more reliably reduce malfunctions of electrical components and corrosion on metallic components due to moisture permeation into the unit case (36).

According to the third aspect, the space above the condenser (22) is the blowout side space to which the air that has passed through the condenser (22) is blown, and is the space to which hot air is blown. Thus, even if the air inlet unit (75) is splashed with sea water, the water is likely to be evaporated, thereby allowing water to hardly permeate into the unit case (36) of the inside air control system (60). This can more reliably reduce malfunctions of electrical components in the unit case (36) and corrosion on metallic components in the unit case (36).

According to the fourth aspect, the filter cover (79) is provided to cover the membrane filter (76). Thus, the air inlet unit (75) is much less likely to be splashed with sea water, thereby making it possible to more reliably reduce malfunctions of electrical components in the unit case (36) and corrosion on metallic components in the unit case (36). The air inlet unit (75) is also much less likely to be soiled with dirt and dust, thereby making it possible to reliably reduce the filter clogged with dirt.

According to the fifth aspect, the air box (78) of the air inlet unit (75) can be disposed by effectively utilizing the space on the side of the electrical component box (17) disposed above the condenser (22).

DESCRIPTION OF EMBODIMENTS

Embodiments of the present invention will now be described in detail with reference to the drawings. Note that the following description of embodiments is merely examples in nature, and is not intended to limit the scope, application, or uses of the present invention.

Figure 1:
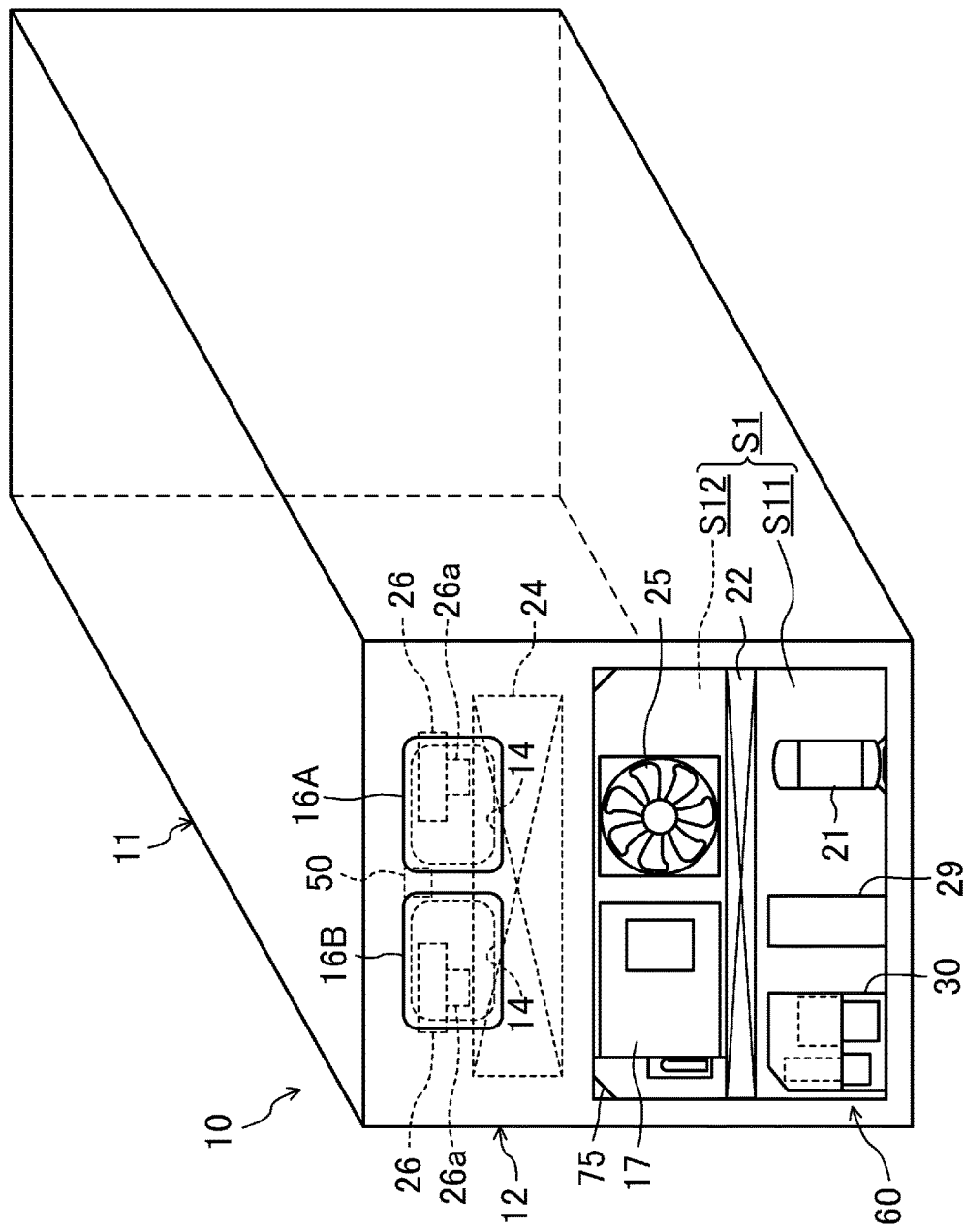
FIG. 1 is a perspective view illustrating a container refrigeration apparatus according to an embodiment of the present invention as viewed from outside.
Figure 2:
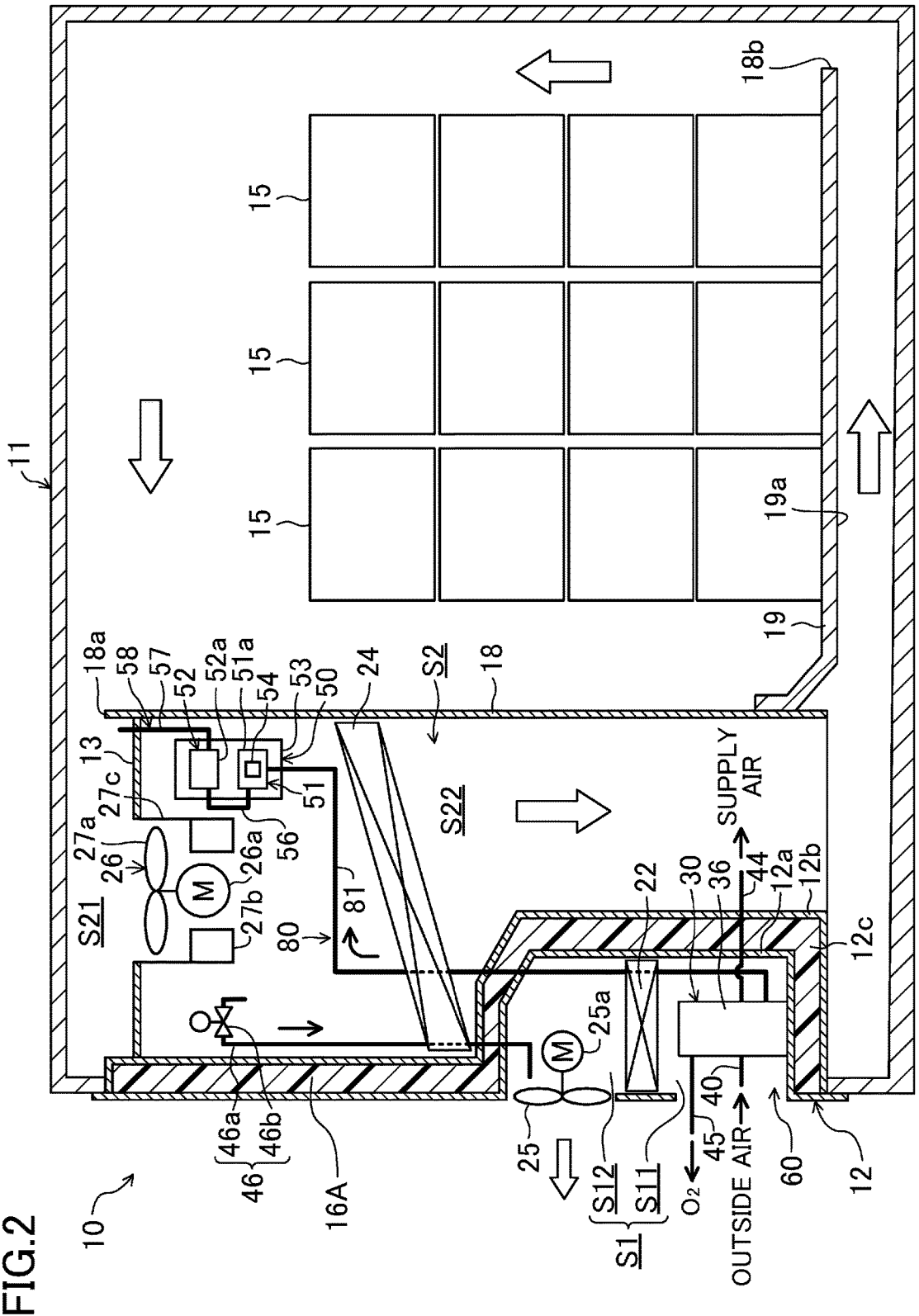
FIG. 2 is a side-face cross-sectional view illustrating a general configuration of the container refrigeration apparatus.

As shown in FIGS. 1 and 2, a container refrigeration apparatus (10) is provided to a container (11) for use in, e.g., marine transportation, and cools the air in the container (11).

Boxed plants (15) are stored in the container (11). The plants (15) breathes by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere (CA) system (inside air control system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a, 12b) are made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction opening (18a) is formed between the upper end of the partition plate (18) and a ceiling surface of the container (11). Air in the container (11) is taken into the internal storage space (S2) through the suction opening (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) partitions the internal storage space (S2) vertically such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout opening (18b) through which the air which has been cooled by the container refrigeration apparatus (10) is blown into the container (11) is provided at an end of the floorboard (19) opposite from the open end of the container (11) (on the right side in FIG. 2).

<Configuration of Refrigerant Circuit and Other Components>

Figure 3:
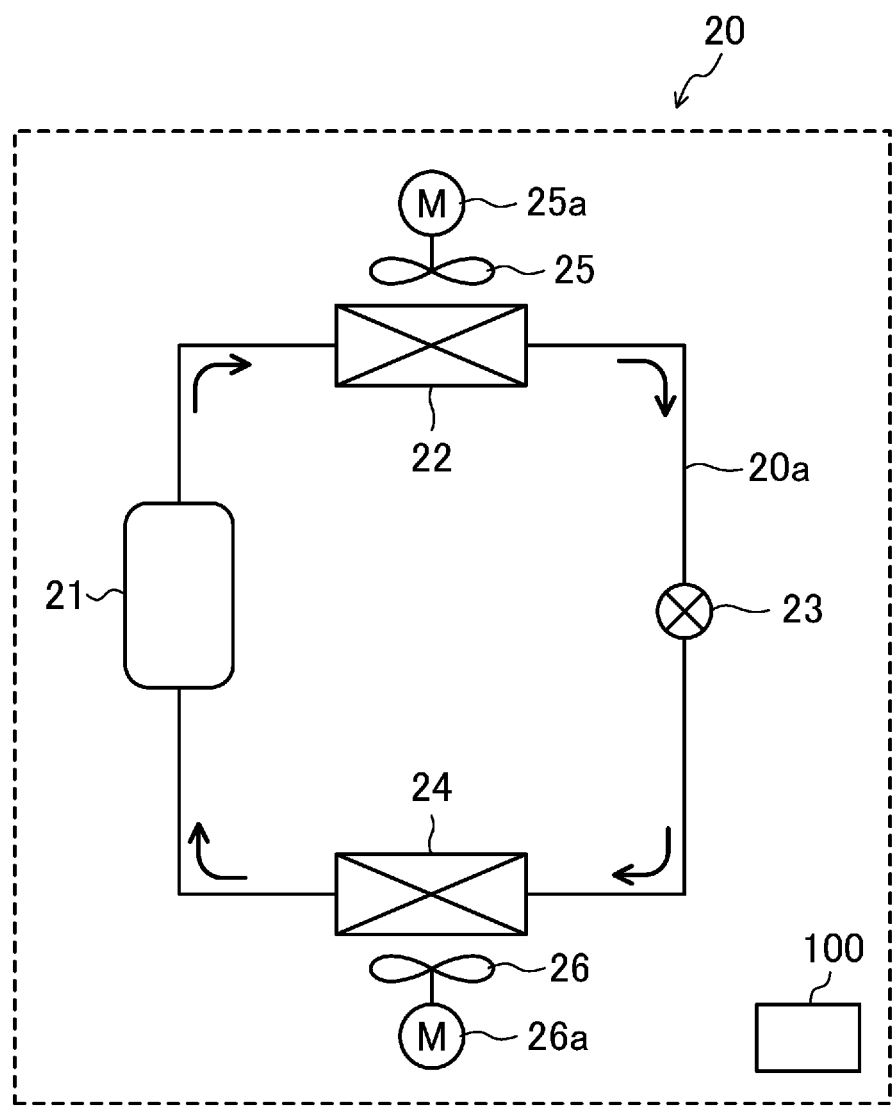
FIG. 3 is a piping diagram illustrating a configuration of a refrigerant circuit in the container refrigeration apparatus.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent from the external fan (25) to the condenser (22). In this embodiment, the external fan (25) is comprised of a propeller fan.

Two internal fans (26) are disposed near the evaporator (24). The internal fans (26) are driven in rotation by internal fan motors (26a), and draw the air in the container (11) through a suction opening (18a) and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stator vanes (27b), and a fan housing (27c). The propeller fan (27a) is coupled to the internal fan motor (26a), and driven in rotation by the internal fan motor (26a) about a rotation axis to blow the air in an axial direction. The plurality of stator vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior space of the container (11). A plate member is arranged to close the second space (S12) from the exterior space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
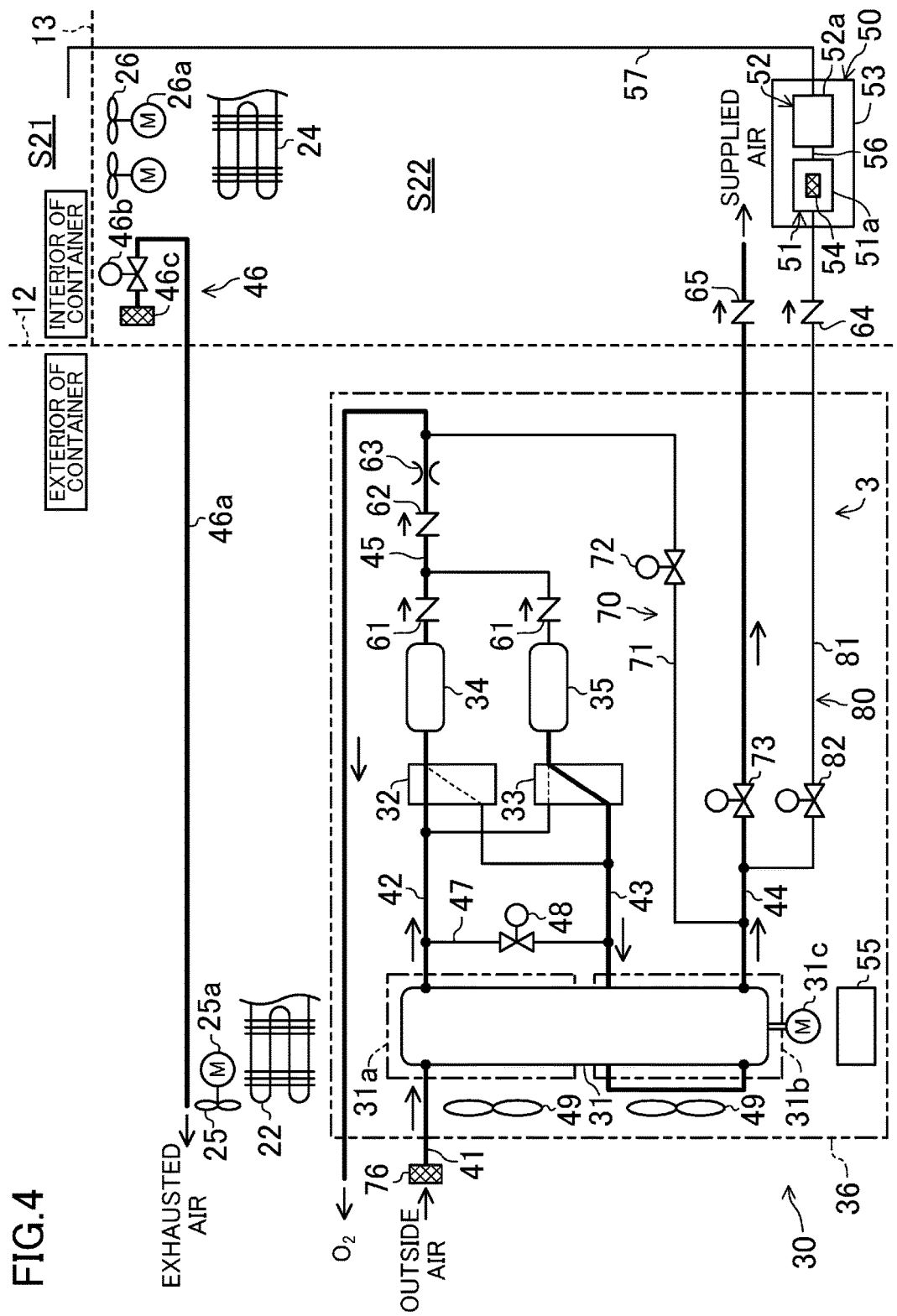
FIG. 4 is a piping diagram illustrating a configuration of a controlled atmosphere system (CA system) in the container refrigeration apparatus, together with the flow of air during a first operation.

As shown in FIG. 4, the CA system (60) includes a gas supply device (30), an exhaust portion (46), a sensor unit (50), a controller (55), and an air inlet unit (80), and controls the oxygen concentration and carbon dioxide concentration of the air in the container (11). The term "concentration" to be used in the following description always indicates a "volumetric concentration."

[Gas Supply Device]

Configuration of Gas Supply Device

The gas supply device (30) produces nitrogen-enriched air with a low oxygen concentration to be supplied to the interior of the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes: an air circuit (3) connecting together an air pump (31), first and second directional control valves (32) and (33), and first and second adsorption columns (34) and (35) each provided with an adsorbent for adsorbing a nitrogen component in the air; and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the unit case (36), and includes a first pump mechanism (a pressurizing portion) (31a) and a second pump mechanism (a depressurizing portion) (31b), each of which sucks and pressurizes the air and discharges the pressurized air. The first and second pump mechanisms (31a) and (31b) are connected to a driving shaft of a motor (31c), and are driven in rotation by the motor (31c) to suck and pressurize the air, and discharge the pressurized air.

One end of an outside air passage (41) arranged so as to pass through the unit case (36) from the interior to exterior of the unit case (36) is connected to the inlet of the first pump mechanism (31a). An air-permeable, waterproof membrane filter (76) is provided at the other end of the outside air passage (41). The outside air passage (41) is made of a flexible tube. Although not shown in the drawings, the other end of the outside air passage (41) where the membrane filter (76) is provided is arranged in the second space (S12) of the external storage space (S1) above the condenser (22). Due to this configuration, the first pump mechanism (31a) sucks and pressurizes the outside air from which moisture has been removed while flowing from the outside to inside of the unit case (36) through the membrane filter (76) provided at the other end of the outside air passage (41). On the other hand, an outlet of the first pump mechanism (31a) is connected to one end of a discharge passage (42). The other end (downstream end) of the discharge passage (42) is divided into two branches, which are connected to the first directional control valve (32) and the second directional control valve (33), respectively.

An inlet of the second pump mechanism (31b) is connected to one end of a suction passage (43). The other end (upstream end) of the suction passage (43) is divided into two branches, which are connected to the first and second directional control valves (32) and (33), respectively. On the other hand, an outlet of the second pump mechanism (31b) is connected to one end of a supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

In this embodiment, the discharge passage (42) and the suction passage (43) are connected together by a bypass passage (47). The bypass passage (47) is provided with a bypass open/close valve (48) of which the opening/closing operation is controlled by the controller (55).

The first and second pump mechanisms (31a) and (31b) of the air pump (31) are configured as oil-free pumps without lubricant oil. Two blower fans (49) are disposed on the side of the air pump (31) to cool the air pump (31) by blowing air to the air pump (31).

(Directional Control Valve)

The first and second directional control valves (32) and (33) are provided in the air circuit (3) between the air pump (31) and the first and second absorption columns (34) and (35), and switches the connection between the air pump (31) and the first and second absorption columns (34) and (35) among three connection states (first to third connection states) which will be described later. This switching operation will be controlled by the controller (55).

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35). The second directional control valve (33) switches between the first state where the second adsorption column (35) is allowed to communicate with the inlet of the second pump mechanism (31b) to be blocked from the outlet of the first pump mechanism (31a) (the state shown in FIG. 4), and the second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be the first state, the air circuit (3) is switched to a first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component that has been adsorbed onto the adsorbent.

Figure 5:
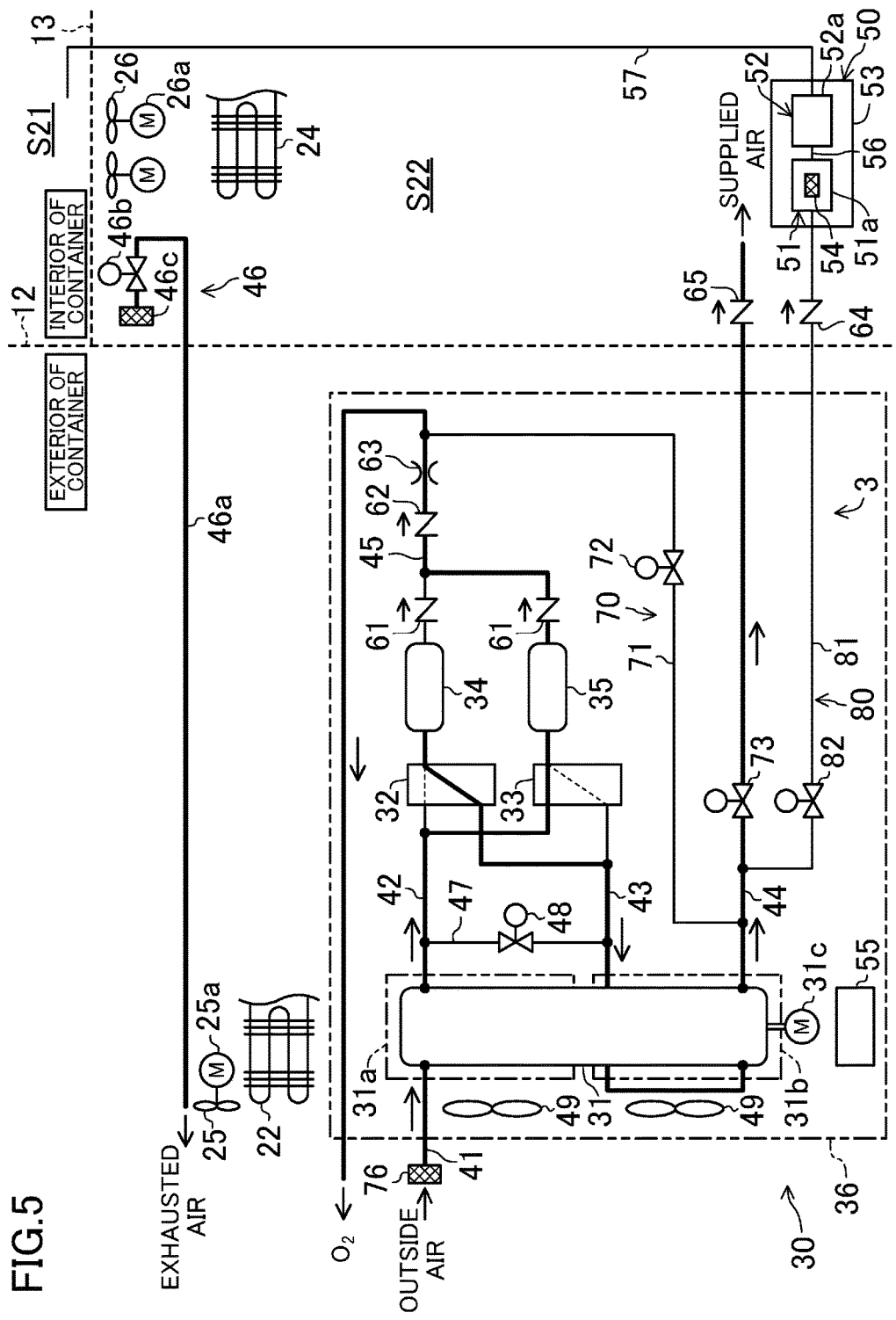
FIG. 5 is a piping diagram illustrating a configuration of the CA system in the container refrigeration apparatus, together with the flow of air during a second operation.

If the first and second directional control valves (32) and (33) are set to be the second state, the air circuit (3) is switched to a second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

If the first directional control valve (32) is set to be the first state, and the second directional control valve (33) is set to be the second state, the air circuit (3) is switched to a third connection state where the outlet of the first pump mechanism (31a) is connected to the first adsorption column (34), and the outlet of the first pump mechanism (31a) is connected to the second adsorption column (35) (not shown). In this state, both of the first and second adsorption columns (34) and (35) are connected to the outlet of the first pump mechanism (31a), which supplies pressurized outside air to both of the first and second adsorption columns (34) and (35). In this state, the adsorption operation is performed on both of the first and second adsorption columns (34) and (35).

(Adsorption Column)

The first and second adsorption columns (34) and (35) are configured as cylindrical members filled with an adsorbent. The adsorbent that fills the first and second adsorption columns (34) and (35) absorbs a nitrogen component in a state where the adsorption columns (34, 35) are pressurized, and desorbs the adsorbed nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air may be absorbed by using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and

(35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied to the interior of the container (11), thus increasing the humidity in the container (11). Furthermore, the adsorbent is regenerated, which may extend the adsorbent's life.

In this configuration, if the air pump (31) supplies the pressurized outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including a less nitrogen component than the outside air does. On the other hand, if the air pump (31) sucks the air from the first and second adsorption columns (34) and (35) to depressurize these columns (34) and (35), the nitrogen component that has been adsorbed onto the adsorbent is desorbed. This produces nitrogen-enriched air that has had its nitrogen concentration increased and oxygen concentration lowered by including a more nitrogen component than the outside air does. In this embodiment, the nitrogen-enriched air may be 92% nitrogen and 8% oxygen, for example.

The respective other ends of the first and second adsorption columns (34) and (35) (functioning as outlets during pressurization) are connected to one end of an oxygen exhaust passage (45) through which the oxygen-enriched air that has been produced in the first and second adsorption columns (34) and (35) from the pressurized outside air supplied by the first pump mechanism (31a) is guided toward the outside of the container (11). The one end of the oxygen exhaust passage (45) is divided into two branches, which are connected to the other ends of the first and second adsorption columns (34) and (35), respectively. The other end of the oxygen exhaust passage (45) opens outside the gas supply device (30), i.e., outside the container (11). The oxygen exhaust passage (45) has a portion connected to the other end of the first adsorption column (34), and a portion connected to the other end of the second adsorption columns (35). Each of these portions is provided with a check valve (61) which prevents backflow of the air from the oxygen exhaust passage (45) toward the first and second adsorption columns (34) and (35).

A check valve (62) and an orifice (63) are arranged at some midpoints of the oxygen exhaust passage (45) so as to be sequentially arranged from one end to the other end of the oxygen exhaust passage (45). The check valve (62) prevents backflow of the nitrogen-enriched air from an exhaust connection passage (71), described later, toward the first and second adsorption columns (34) and (35). The orifice (63) depressurizes the oxygen-enriched air which has flowed out of the first and second adsorption columns (34) and (35) before the oxygen-enriched air is exhausted from the container.

(Supply-Exhaust Switching Mechanism)

The air circuit (3) is provided with a supply-exhaust switching mechanism (70) which switches between a gas supply operation, described later, of supplying the produced nitrogen-enriched air into the container (11) (see FIGS. 4 and 5), and a gas exhaust operation of exhausting the produced nitrogen-enriched air to the outside of the container (11) (not shown). The supply-exhaust switching mechanism (70) includes an exhaust connection passage (71), an exhaust open/close valve (72), and a supply open/close valve (73).

The exhaust connection passage (71) has one end connected to the supply passage (44), and the other end connected to the oxygen exhaust passage (45). The other end of the exhaust connection passage (71) is connected to the oxygen exhaust passage (45) so as to be located further toward the outside of the container than the orifice (63).

The exhaust open/close valve (72) is provided to the exhaust connection passage (71). The exhaust open/close valve (72) is provided at the midway of the exhaust connection passage (71), and is comprised of a solenoid valve switching between an open state where the nitrogen-enriched air that has flowed from the supply passage (44) is allowed to flow through the exhaust connection passage (71), and a closed state where the nitrogen-enriched air is prevented from flowing through the exhaust connection passage (71). The opening/closing operation of the exhaust open/close valve (72) is controlled by the controller (55).

The supply open/close valve (73) is provided at the supply passage (44) so as to be located further toward the other end (toward the inside of the container) than the junction where the exhaust connection passage (71) is connected. The supply open/close valve (73) is provided at the supply passage (44) so as to be located further toward the inside of the container than the junction where the exhaust connection passage (71) is connected, and is comprised of a solenoid valve switching between an open state where the nitrogen-enriched air is allowed to flow toward the inside of the container, and a closed state where the nitrogen-enriched air is prevented from flowing toward the inside of the container. The opening/closing operation of the supply open/close valve (73) is controlled by the controller (55).

(Measurement Unit)

The air circuit (3) is provided with a measurement unit (80) used to perform a supply air measurement operation of measuring the concentration of the generated nitrogen-enriched air (not shown) using an oxygen sensor (51) of a sensor unit (50) which is provided to the interior of the container (11) and which will be described later. The measurement unit (80) includes a branch pipe (a measurement passage) (81) and a measurement on-off valve (82), and is configured to diverge, and guide to the oxygen sensor (51), part of nitrogen-enriched air passing through the supply passage (44).

Specifically, the branch pipe (81) has one end connected to the supply passage (44), and the other end coupled to an oxygen sensor box (51a), described later, of the oxygen sensor (51). In this embodiment, the branch pipe (81) is branched from the supply passage (44) in the unit case (36) and extends from the interior to exterior of the unit case (36).

The measurement on-off valve (82) is provided to the branch pipe (81) in the unit case (36). The measurement on-off valve (82) is comprised of a solenoid valve switching between an open state where the flow of nitrogen-enriched air in the branch pipe (81) is allowed, and a closed state where the flow of the nitrogen-enriched air in the branch pipe (81) is blocked. The opening/closing operation of the measurement on-off valve (82) is controlled by the controller (55). As will be described in detail later, the measurement on-off valve (82) is open only when a supply air measurement operation to be described later is performed, and is closed in the other modes.

[Exhaust Portion]

Configuration of Exhaust Portion

As shown in FIG. 2, the exhaust portion (46) includes an exhaust passage (46a) connecting the internal storage space (S2) to the exterior space of the container, an exhaust valve (46b) connected to the exhaust passage (46a), and a membrane filter (46c) provided to an inlet end (the end adjacent to the interior of the container) of the exhaust passage (46a). The exhaust passage (46a) passes through the casing (12) from the interior to exterior of the casing (12). The exhaust valve (46b) is provided adjacent to the interior of the exhaust passage (46a), and is comprised of a solenoid valve switching between an open state where the air is allowed to flow through the exhaust passage (46a), and a closed state where the air is prevented from flowing through the exhaust passage (46a). The opening/closing operation of the exhaust valve (46b) is controlled by the controller (55).

Operation of Exhaust Portion

When the internal fan (26) is rotating, an exhaust operation is performed in which the controller (55) opens the exhaust valve (46b) to exhaust the air (inside air) in the internal storage space (S2) communicating with the interior of the container to the outside.

Specifically, when the internal fan (26) is rotating, the pressure of the secondary space (S22) on the blowout side becomes higher than the pressure of the exterior space of the container (i.e., the atmospheric pressure). Thus, when the exhaust valve (46b) is open, due to the pressure difference between the ends of the exhaust passage (46a) (the pressure difference between the external space of the container and the secondary space (S22)), the air in the internal storage space (S2) communicating with the interior of the container (inside air) is exhausted out of the container through the exhaust passage (46a).

[Sensor Unit]

Configuration of Sensor Unit

As shown in FIG. 2, the sensor unit (50) is provided to the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic cell-type sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54), that is air-permeable and waterproof, is attached. In addition, one end of the connection pipe (56) is coupled via a connector to one of the side surfaces of the oxygen sensor box (51a). Further, a branch pipe (81) of a measurement unit (80) is coupled via a connector (pipe joint) to a lower surface of the oxygen sensor box (51a).

The carbon dioxide sensor (52) has a carbon dioxide sensor box (52a). The carbon dioxide sensor (52) is a non-dispersive infrared sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). Furthermore, one end of the exhaust pipe (57) is coupled via a connector to the other side surface of the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the suction opening of the internal fans (26). That is, the exhaust pipe (57) allows the internal space of the carbon dioxide sensor box (52a) to communicate with the primary space (S21) of the internal storage space (S2).

Concentration Measurement Operation

The secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. As can be seen, the air sequentially flows from the interior of the container to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the composition of the air (the oxygen concentration and carbon dioxide concentration of the air) in the container (11) are controlled to a desired target composition (e.g., 3% oxygen and 5% carbon dioxide).

[Air Inlet Unit]

Figure 6:
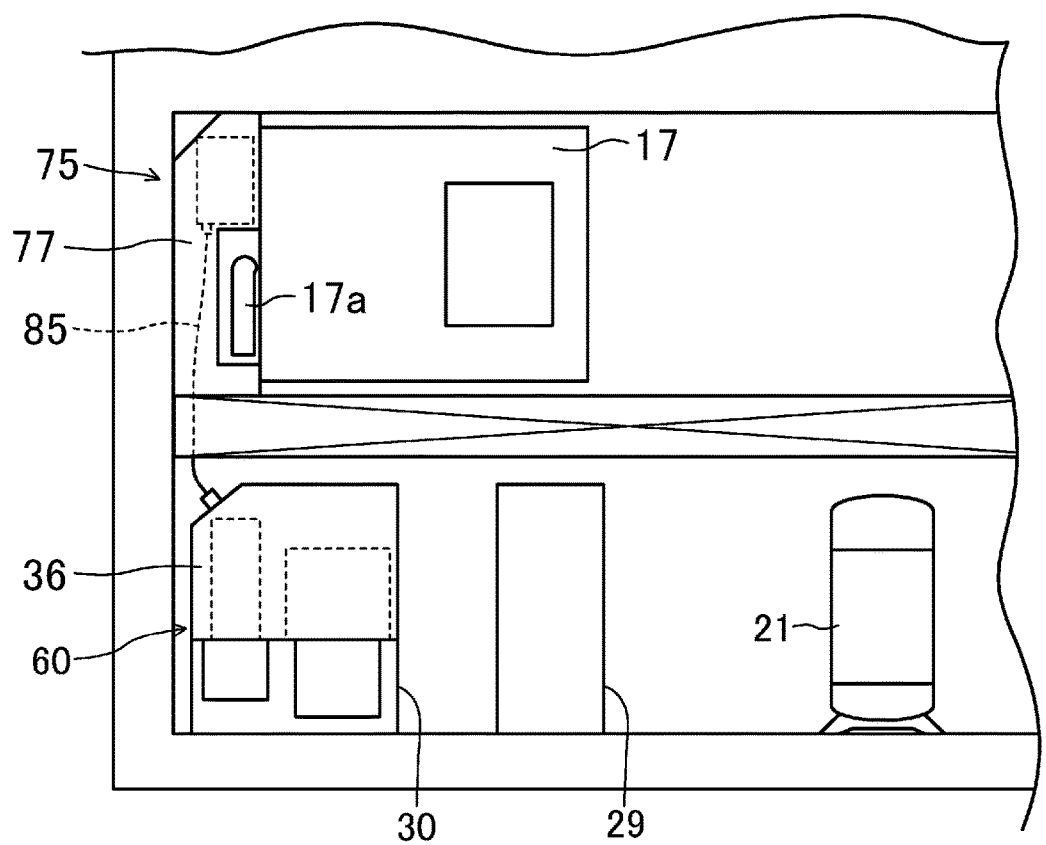
FIG. 6 is an enlarged perspective view illustrating main parts of the container refrigeration apparatus.
Figure 7:
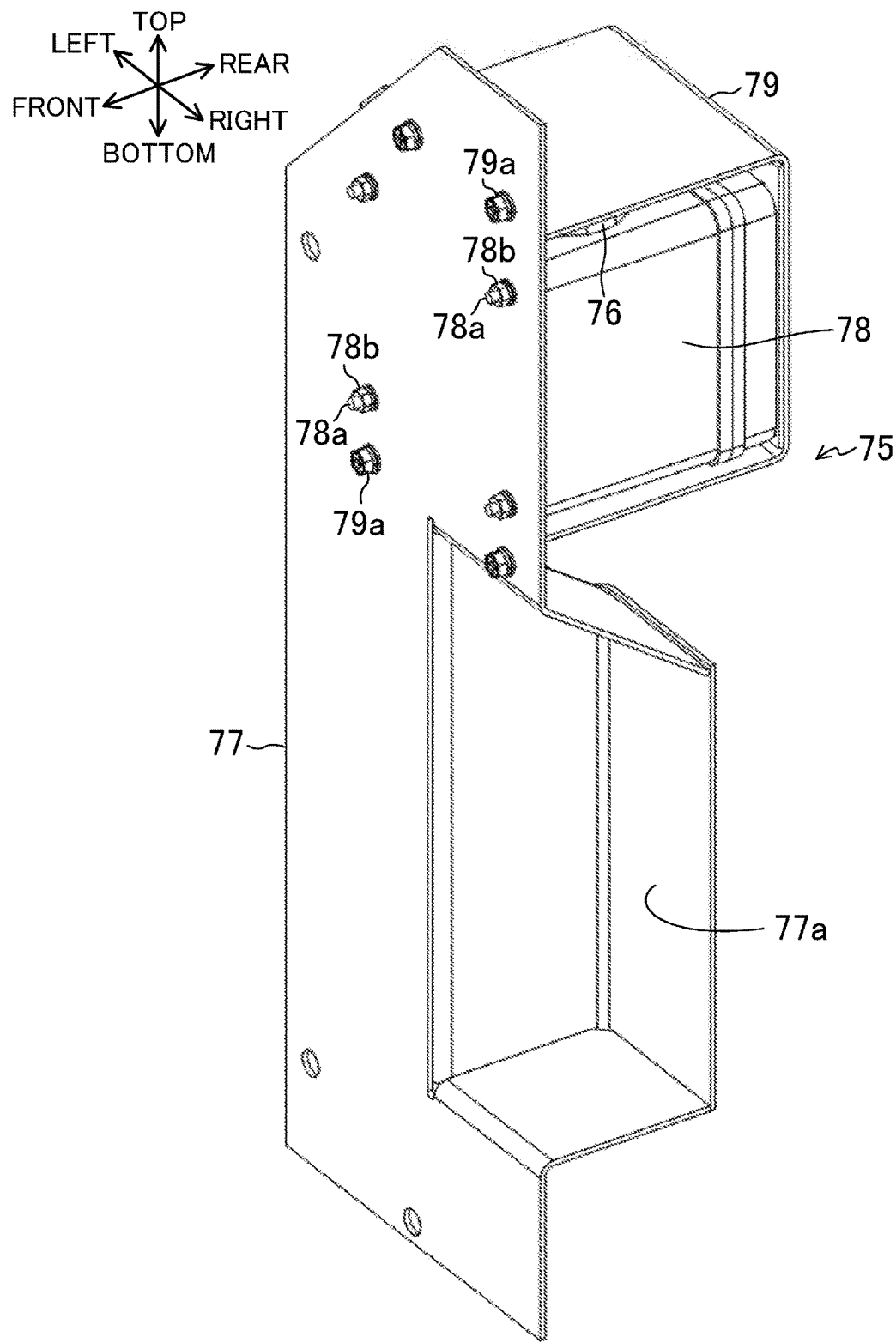
FIG. 7 is a perspective view of an air inlet unit, when viewed from the front-right side.
Figure 8:
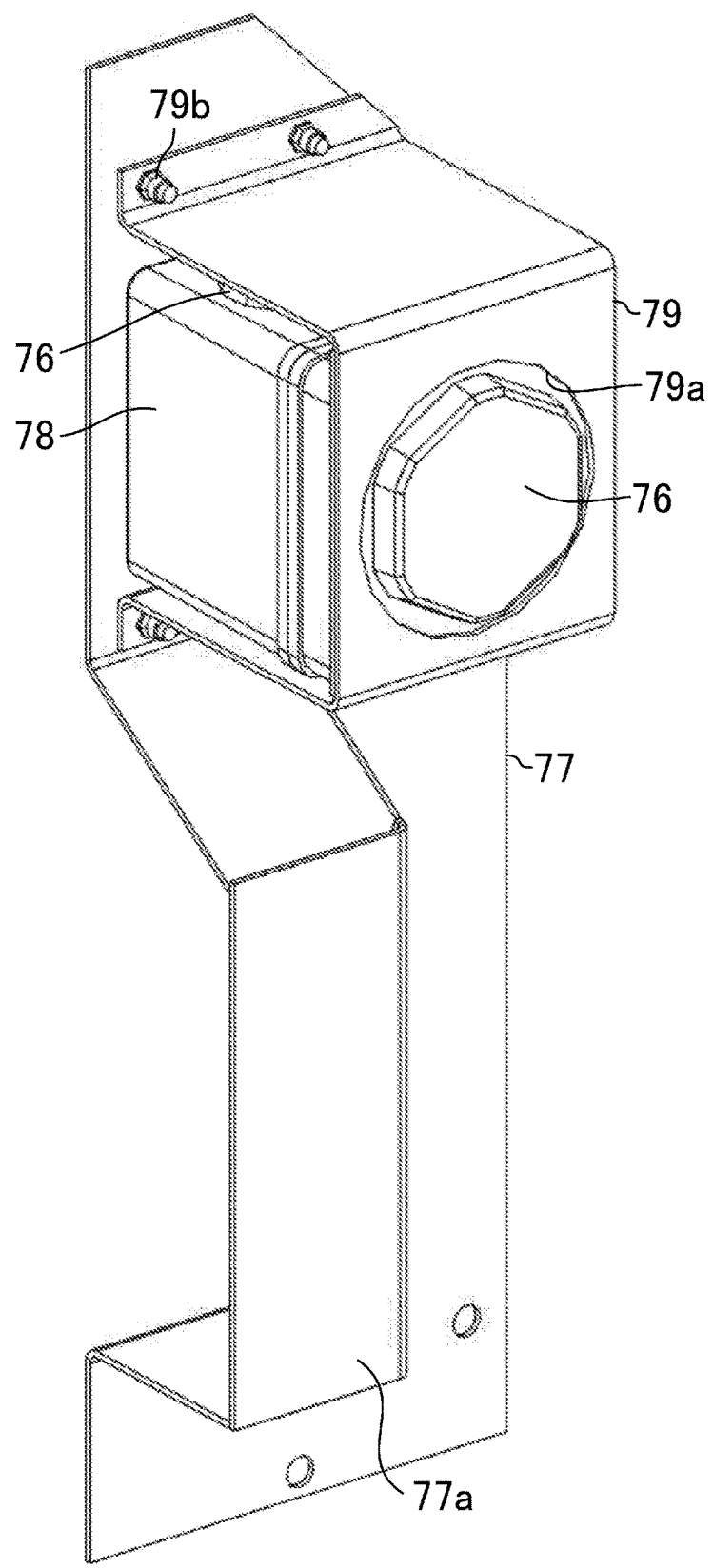
FIG. 8 is a perspective view of the air inlet unit, when viewed from the rear-right side.
Figure 9:
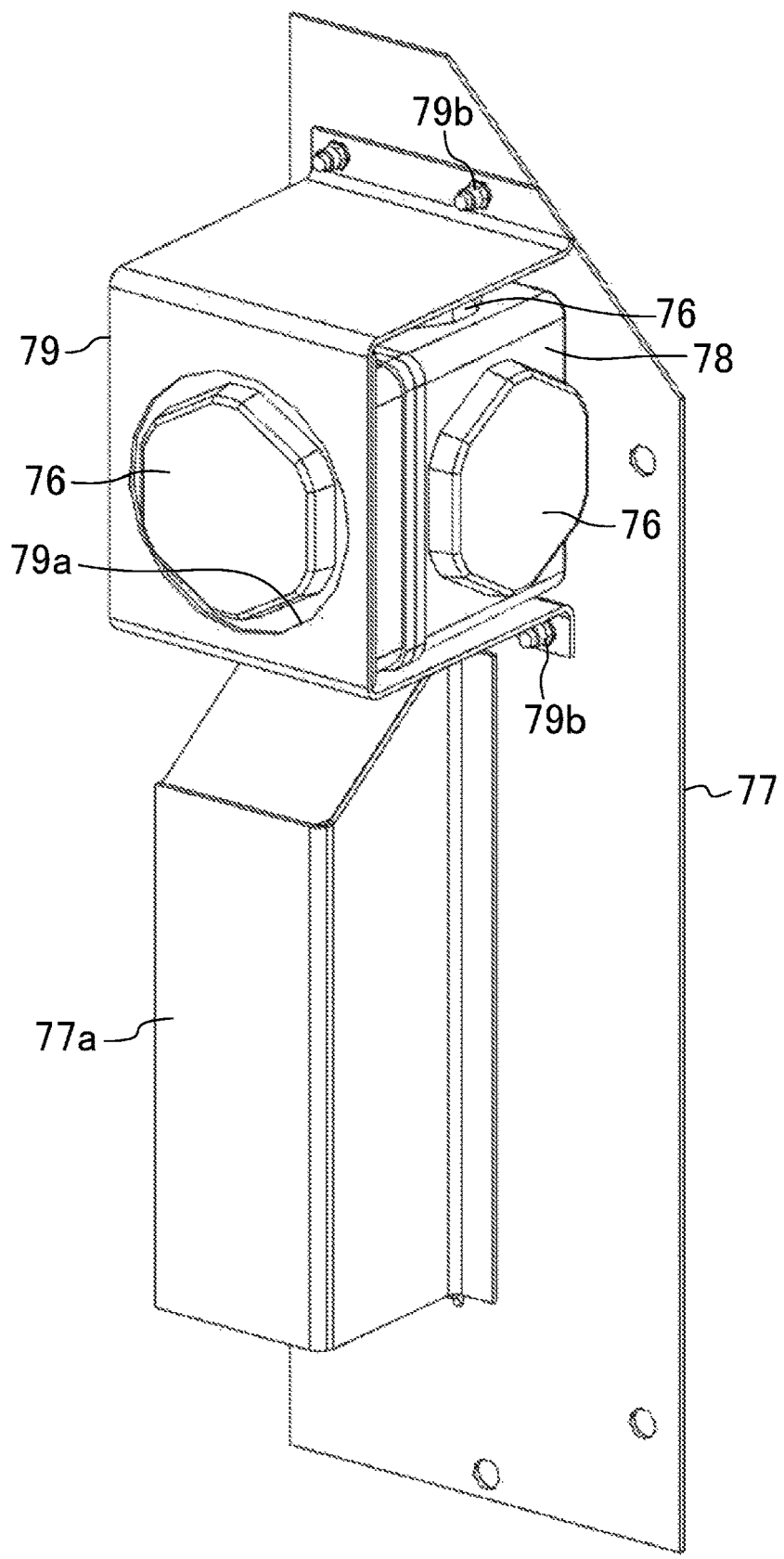
FIG. 9 is a perspective view of the air inlet unit, when viewed from the rear-left side.
Figure 10:
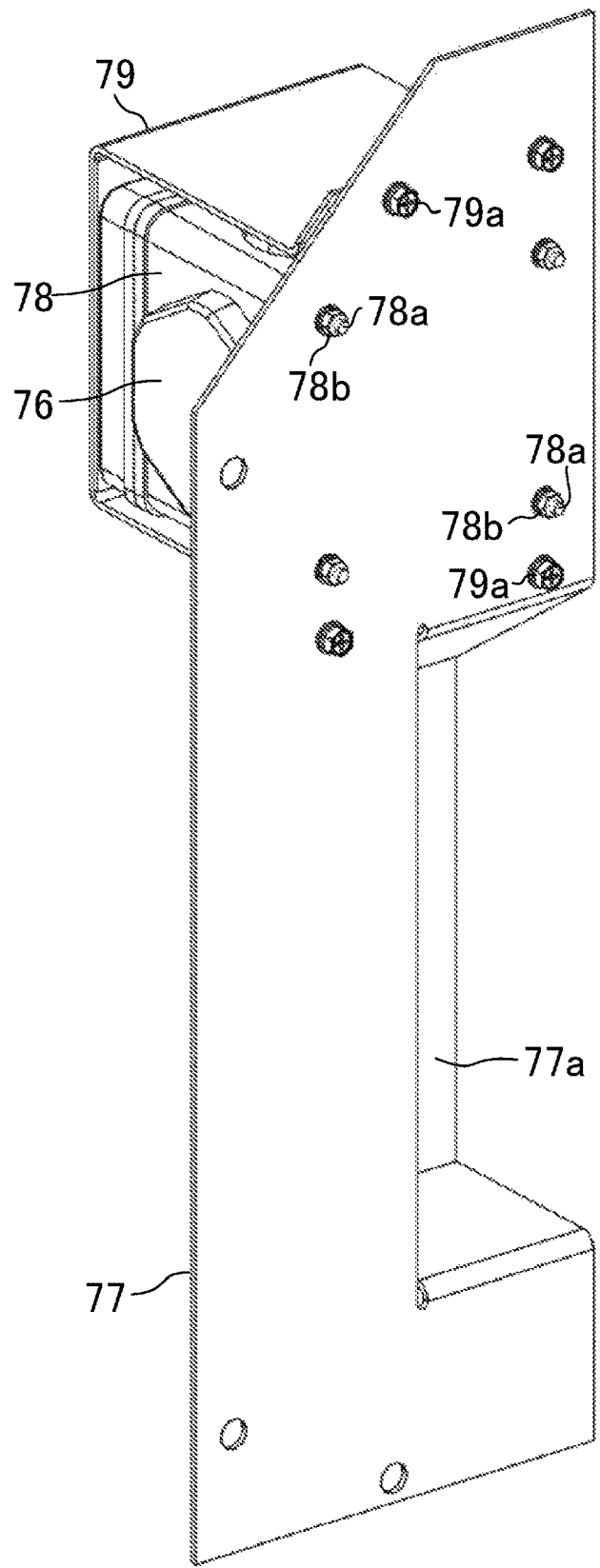
FIG. 10 is a perspective view of the air inlet unit, when viewed from the front-left side.
Figure 11:
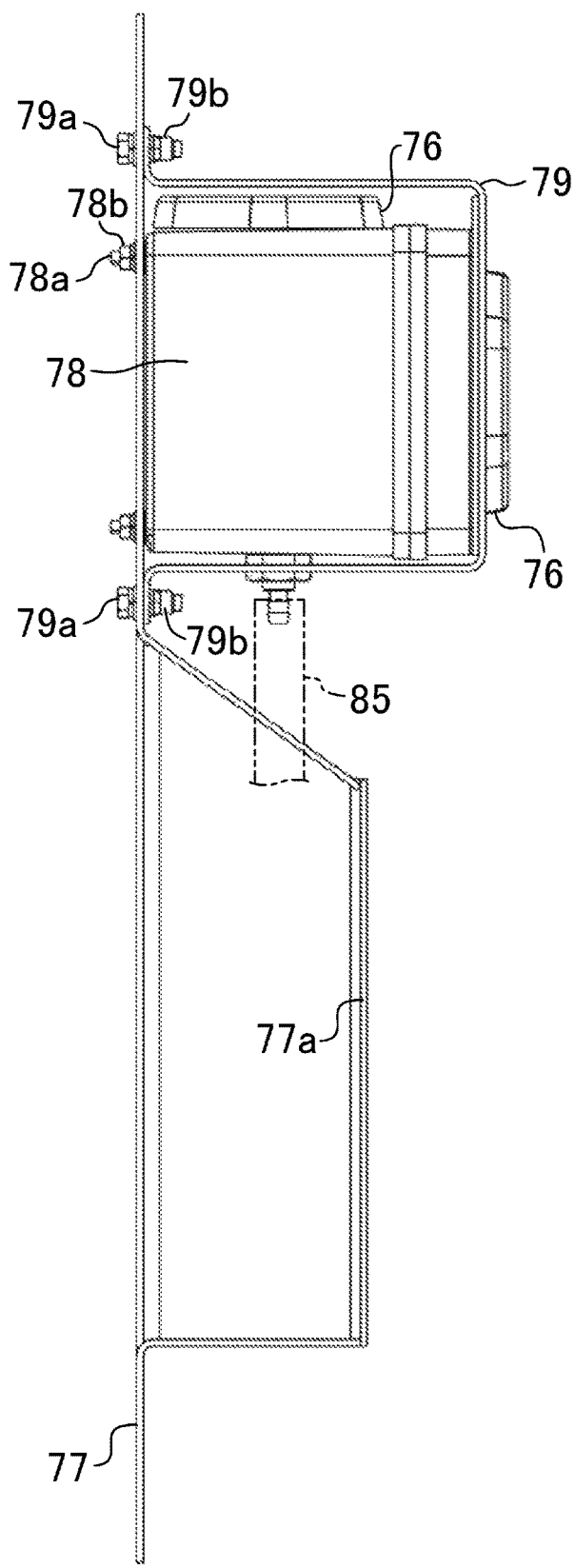
FIG. 11 is a right side view of the air inlet unit.
Figure 12:
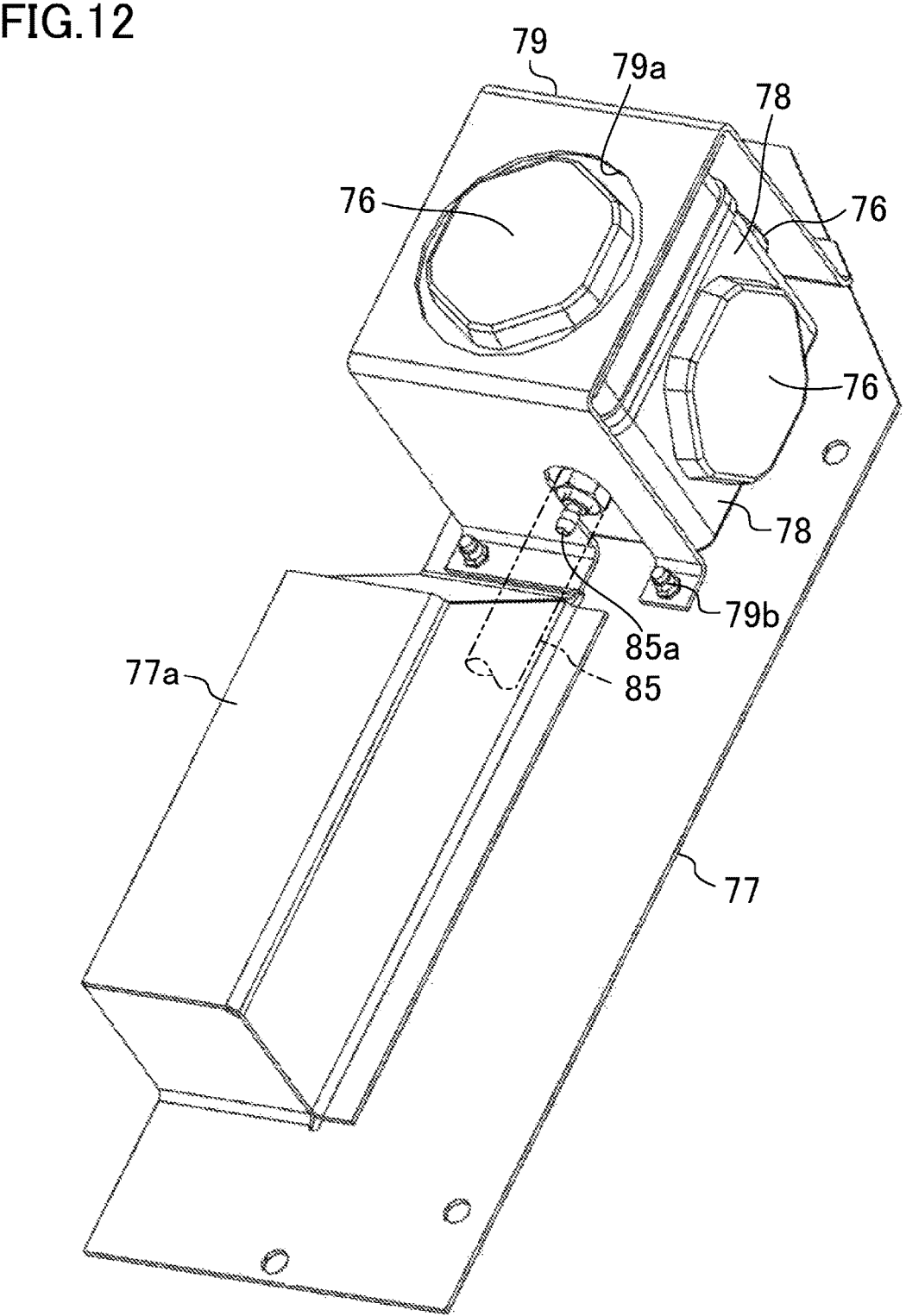
FIG. 12 is a perspective view of the air inlet unit, when viewed from the bottom.

As shown in FIGS. 1 and 6, the gas supply device (30) is disposed at the lower left corner of the external storage space (S1) (at the lower left end of the condenser (22)), whereas the air inlet unit (75) is disposed at the left of the electrical component box (17) when the external storage space (S1) is viewed from the front. The air pump (31) in the unit case (36) is connected to one end of an air tube (85) constituting the outside air passage (41) sucking air. The air inlet unit (75) is connected to the other end of the air tube (85).

FIGS. 7-12 are views illustrating the appearance of the air inlet unit (75), when viewed from various directions. The air inlet unit (75) includes an attachment plate (77), an air box (78), and a filter cover (79). The attachment plate (77) fixes a plurality of membrane filters (76) to the casing (12) of the container refrigeration apparatus (10). The air box (78) is fixed to the upper end portion of the attachment plate (77), and the plurality of membrane filters (76) are attached to the air box (78). The filter cover (79) covers the membrane filters (76) from above. The other end of the air tube (85) is attached to a joint (85a) provided to the lower surface of the air box (78).

In the attachment plate (77), a recess (77a) is formed in a portion slightly below the vertically middle portion of the right edge of the attachment plate (77). This recess (77a) is a recess for housing a handle (17a) opening/closing the door of the electrical component box (17). The air box (78) is attached to a portion of the rear surface of the attachment plate (77) above the recess (77a).

The air-permeable, waterproof membrane filter (76) is attached to the top surface, the rear surface, and the left side surface of the air box (78) when the attachment plate (77) is viewed from the front. The membrane filter (76) includes a membrane filter body in which a male screw is formed, and a nut (a female screw) into which the male screw is screwed (not shown). The membrane filter (76) is fastened to the top surface, the rear surface, and the left side surface of the plates of the air box (78) by the male screw and the female screw. The air box (78) is fixed to the attachment plate (77) by fastening a nut (78b) to a screw (78a) provided to the air box (78).

Although the membrane filter (76) itself is waterproof, the filter cover (79) is provided to prevent water permeation from its vicinity. The filter cover (79) is a bent member which is c-shaped when viewed from the side surface. The rear surface of the filter cover (79) is provided with a hole (79a) into which the membrane filter at the rear surface of the air box is inserted. This filter cover (79) is attached to the attachment plate (77) by a screw.

As can be seen, in this embodiment, the air which has passed through the membrane filter (76) disposed above the condenser (22) is supplied to the air pump of the gas supply device (30).

Operation

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout opening (18b). Thus, the air in the container (11) is cooled.

<Basic Operation of Gas Supply Device>

In the gas supply device (30), a first operation in which the first adsorption column (34) is pressurized and the second adsorption column (35) is depressurized (see FIG. 4), and a second operation in which the first adsorption column (34) is depressurized and the second adsorption column (35) is pressurized (see FIG. 5) are alternately repeated every predetermined time (e.g., 14.5 seconds) to produce the nitrogen-enriched air and the oxygen-enriched air. In this embodiment, a pressure equalization operation (not shown) in which the first and second adsorption columns (34) and (35) are both pressurized for a predetermined time (e.g., 1.5 seconds) during the intervals between the first and second operations. The controller (55) operates the first and second directional control valves (32) and (33) to perform switching among the operations.

<<First Operation>>

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the pressurized outside air to the first adsorption column (34). A nitrogen component contained in the air which has flowed into the first adsorption column (34) is adsorbed on the adsorbent of the first adsorption column (34). Thus, during the first operation, the first pump mechanism (31a) supplies the pressurized outside air to the first adsorption column (34), in which the adsorbent adsorbs nitrogen component in the outside air, thereby producing oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31b) sucks the air from the second adsorption column (35). Simultaneously, the second pump mechanism (31b) also sucks the nitrogen component adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), pressurized, and then, discharged toward the supply passage (44).

<<Second Operation>>

During the second operation, the controller (55) switches the first and second directional control valves (32) and (33) to the second state shown in FIG. 5. Thus, the air circuit (3) is set to the second connection state in which the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the pressurized outside air to the second adsorption column (35). A nitrogen component contained in the air which has flowed into the second adsorption column (35) is adsorbed on the adsorbent of the second adsorption column (35). Thus, during the second operation, the first pump mechanism (31a) supplies the pressurized outside air to the second adsorption column (35), in which the adsorbent adsorbs the nitrogen component in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks the nitrogen component adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), pressurized, and then, discharged toward the supply passage (44).

As mentioned above, in the first operation, the first adsorption column (34) is pressurized by the first pump mechanism (31a), thereby performing the adsorption operation, whereas the second adsorption column (35) is depressurized by the second pump mechanism (31b), thereby performing the desorption operation. On the other hand, in the second operation, the second adsorption column (35) is pressurized by the first pump mechanism (31a), thereby performing the adsorption operation, whereas the first adsorption column (34) is depressurized by the second pump mechanism (31b), thereby performing the desorption operation. Thus, if the first operation is switched to the second operation or the second operation is switched to the first operation without the pressure equalization operation performed during the interval between the first and second operations, the pressure in the adsorption column where the desorption operation has been performed before the switching is remarkably low immediately after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). Due to this configuration, the inner pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and which has performed the desorption operation before the switching. Thus, the adsorption operation is immediately performed after the connection with the first pump mechanism (31a).

In this manner, the gas supply device (30) alternately repeats the first and second operations, with the pressure equalization operation performed during the intervals, thereby producing the nitrogen-enriched air and the oxygen-enriched air in the air circuit (3).

Advantages of Embodiment

According to this embodiment, the air inlet unit (75) mounting the membrane filter (76) thereon is disposed above the unit case (36) of the inside air control system (60). Thus, the air inlet unit (75) is less likely to be splashed with sea water even in the marine atmosphere. This hardly allows water to permeate from the air inlet unit (75) into the unit case (36) of the inside air control system (60). Therefore, this can reduce malfunctions of electrical components and corrosion on metallic components due to moisture permeation into the unit case (36).

In particular, the air inlet unit (70) is disposed in the space above the condenser (22). Thus, the air inlet unit (75) is much less likely to be splashed with sea water. The space above the condenser (22) is the blowout side space to which the air that has passed through the condenser (22) is blown, and is the space to which hot air is blown. Thus, even if the air inlet unit (75) is splashed with sea water, the water is likely to be evaporated. As a result, water further hardly permeates into the unit case (36) of the inside air control system (60), thereby making it possible to more reliably reduce malfunctions of electrical components in the unit case (36) and corrosion on metallic components in the unit case (36).

The filter cover (79) is provided to cover the membrane filter (76). Thus, the membrane filter (76) is also less likely to be splashed with sea water. This makes it possible to more reliably reduce malfunctions of electrical components in the unit case (36) and corrosion on metallic components in the unit case (36). Also, the air box (78) of the air inlet unit (75) can be disposed by effectively utilizing the space disposed above the condenser (22) and on the side of the electrical component box (17).

Other Embodiments

The above embodiments may also be configured as follows.

For example, in the above embodiment, the air inlet unit (75) provided with the membrane filters (76) is disposed adjacent to the electrical component box (17). Alternatively, as long as the air inlet unit (75) is disposed above the unit case (36) of the inside air control system (60), the position of the air inlet unit (75) may be changed according to the specific configuration of the container refrigeration apparatus (10).

Also, in the above embodiment, the air inlet unit (75) provided with the membrane filters (76) is comprised of the attachment plate (77), the air box (78), and the filter cover (79). Alternatively, the configuration of the air inlet unit (75) may also be changed according to the specific configuration of the container refrigeration apparatus (10) and arrangement of components of the container refrigeration apparatus (10).

Note that the foregoing description of the embodiment is a merely beneficial example in nature, and is not intended to limit the scope, application, or uses of the present disclosure.

INDUSTRIAL APPLICABILITY

As can be seen from the foregoing description, the present invention is useful as a container refrigeration apparatus including an inside air control system which supplies a mixed gas such as a nitrogen mixed gas into a container.

DESCRIPTION OF REFERENCE CHARACTERS

10 Container Refrigeration Apparatus
11 Container
17 Electrical Component Box
22 Condenser
31 Air Pump
36 Unit Case
60 Inside Air Control System (CA system)

75 Air Inlet Unit
76 Membrane Filter
78 Air Box
79 Filter Cover
85 Air Tube
S1 External Storage Space

The invention claimed is:

1. A container refrigeration apparatus which includes an inside air control system configured to supply an interior of a container with a mixed gas, wherein
   an inlet taking air into an air pump provided to an interior of a unit case of the inside air control system is formed in an air inlet unit independent of the unit case, the air pump and the air inlet unit being connected together by an air tube, and
   the air inlet unit is provided with an air-permeable, waterproof membrane filter, and is disposed above the unit case of the inside air control system.

2. The container refrigeration apparatus of claim 1, wherein
   the unit case of the inside air control system is disposed in a space below a condenser of an external storage space, and
   the air inlet unit provided with the membrane filter is disposed in a space above the condenser.

3. The container refrigeration apparatus of claim 2, wherein
   the space, provided with the air inlet unit, above the condenser is a blowout side space to which the air that has passed through the condenser is blown.

4. The container refrigeration apparatus of claim 3, wherein
   the air inlet unit includes an air box to which the membrane filter is attached, and a filter cover which covers the membrane filter from above.

5. The container refrigeration apparatus of claim 4, wherein
   the air box of the air inlet unit is disposed on a side of an electrical component box disposed in the space above the condenser.

* * * * *